US012753702B2

(12) United States Patent
Feldmann

(10) Patent No.: US 12,753,702 B2
(45) Date of Patent: Oct. 6, 2026

(54) STATOR DEVICE FOR DISPOSITION WITHIN A GIVEN TURBINE CASING OF A TURBOMACHINE, CONNECTION SYSTEM FOR A TURBMACHINE, AND TURBOMACHINE

(71) Applicant: MTU Aero Engines AG, Munich (DE)

(72) Inventor: Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 33 days.

(21) Appl. No.: 18/438,766

(22) Filed: Feb. 12, 2024

(65) Prior Publication Data

US 2025/0027421 A1 Jan. 23, 2025

(30) Foreign Application Priority Data

Feb. 17, 2023 (DE) ......................... 102023104051.0

(51) Int. Cl.
*F01D 9/04* (2006.01)
*F01D 25/24* (2006.01)

(52) U.S. Cl.
CPC ........... *F01D 9/042* (2013.01); *F01D 25/246* (2013.01); *F05D 2220/32* (2013.01); *F05D 2240/12* (2013.01); *F05D 2240/14* (2013.01)

(58) Field of Classification Search
CPC ..... F01D 9/00; F01D 9/02; F01D 9/04; F01D 9/042; F01D 25/24; F01D 25/246; F01D 25/26; F05D 2240/12; F05D 2240/14
See application file for complete search history.

(56) References Cited

U.S. PATENT DOCUMENTS

| | | | | |
|---|---|---|---|---|
| 3,860,358 | A | 1/1975 | Cavicchi et al. | |
| 4,759,687 | A | 7/1988 | Miracourt et al. | |
| 5,131,813 | A * | 7/1992 | Przytulski | F01D 25/246 416/220 R |

(Continued)

FOREIGN PATENT DOCUMENTS

| | | | |
|---|---|---|---|
| EP | 0907053 | A2 | 4/1999 |
| EP | 1408200 | A2 | 4/2004 |

(Continued)

*Primary Examiner* — Nathaniel E Wiehe
*Assistant Examiner* — Maxime M Adjagbe
(74) *Attorney, Agent, or Firm* — Davidson Kappel LLC

(57) ABSTRACT

A stator device for disposition within a given turbine casing of a turbomachine, the stator device being provided on its radially outer side with an axially forward connecting element having a radially inward facing forward connecting surface for connection to a forward receiving surface of the turbine casing and an axially rearward connecting element having a radially outward facing rearward connecting surface for connection to a rearward receiving surface of the turbine casing, the rearward connecting surface being pre-curved in the circumferential direction eccentrically with respect to the rearward receiving surface; the rearward connecting element having a rearward rib portion extending substantially linearly away from a platform of the stator device and providing the rearward connecting surface at its radially outer end; and the rib portion being provided at its radially outer end with axially extending projections distributed along the circumferential direction for radially retaining the stator device to the turbine casing.

16 Claims, 4 Drawing Sheets

(56) References Cited

U.S. PATENT DOCUMENTS

| | | | | |
|---|---|---|---|---|
| 5,205,708 | A | 4/1993 | Plemmons et al. | |
| 5,641,267 | A | 6/1997 | Proctor et al. | |
| 5,655,876 | A | 8/1997 | Rock et al. | |
| 5,669,757 | A | 9/1997 | Bracket et al. | |
| 5,797,723 | A | 8/1998 | Frost et al. | |
| 6,183,192 | B1 | 2/2001 | Tressler et al. | |
| 6,361,273 | B1 | 3/2002 | Eng et al. | |
| 6,702,550 | B2 | 3/2004 | Darkins, Jr. et al. | |
| 6,726,446 | B2 | 4/2004 | Arilla et al. | |
| 8,328,511 | B2 | 12/2012 | Hernandez Russe et al. | |
| 9,416,672 | B2 * | 8/2016 | Feldmann | F01D 9/023 |
| 2004/0115043 | A1 | 6/2004 | Lee et al. | |
| 2006/0008347 | A1 | 1/2006 | Boeck et al. | |
| 2006/0251519 | A1 | 11/2006 | Benedetti et al. | |
| 2007/0031244 | A1 | 2/2007 | Ruthemeyer et al. | |
| 2007/0031245 | A1 | 2/2007 | Ruthemeyer et al. | |
| 2008/0206047 | A1 | 8/2008 | Dakowski et al. | |
| 2014/0119902 | A1 * | 5/2014 | Feldmann | F01D 11/12 415/173.1 |
| 2020/0056495 | A1 | 2/2020 | Ponchak et al. | |

FOREIGN PATENT DOCUMENTS

| | | | | |
|---|---|---|---|---|
| EP | 1455053 | A2 | 9/2004 | |
| EP | 3023597 | A1 | 5/2016 | |
| EP | 3176388 | A1 * | 6/2017 | B24B 19/14 |
| FR | 2819010 | A1 | 7/2002 | |
| FR | 2942845 | A1 | 9/2010 | |
| JP | S6030431 | A | 2/1985 | |
| JP | 2002242612 | A | 8/2002 | |

* cited by examiner

STATOR DEVICE FOR DISPOSITION WITHIN A GIVEN TURBINE CASING OF A TURBOMACHINE, CONNECTION SYSTEM FOR A TURBMACHINE, AND TURBOMACHINE

This claims the benefit of German Patent Application DE 102023104051.0, filed on Feb. 17, 2023 which is hereby incorporated by reference herein.

BACKGROUND

The invention relates to a stator device for disposition within a given turbine casing of a turbomachine, a connection system, and to a corresponding turbomachine. The stator device may be disposed in particular radially inwardly of the turbine casing. The stator device is provided on its radially outer side with an axially forward connecting element having a radially inward facing forward connecting surface associated with the forward receiving surface of the turbine casing and an axially rearward connecting element having a radially outward facing rearward connecting surface associated with the rearward receiving surface of the turbine casing.

The connection system includes an annular turbine casing, which defines a centerline, a radial direction, and a circumferential direction. The turbine casing is provided on its radially inner side with an axially forward receptacle having a radially outward facing forward receiving surface and an axially rearward receptacle having a radially inward facing rearward receiving surface.

SUMMARY OF THE INVENTION

A turbine and its components, disposed downstream of the combustor, may be subjected to high thermal and mechanical loading caused by the hot gas flow. In the case of a circumferentially wide stator device, the connecting elements, in particular their connecting surfaces for connection to the receiving surfaces, may happen to become de-arched or de-curved when the turbomachine is in a hot state, so that a respective curvature is widened. Thus, as a result of the radial temperature gradient, in particular a temperature difference, between the receptacles and the connecting elements, it may happen that the receiving surfaces and the connecting surfaces do not fully contact each other in the circumferential direction, but contact each other only locally, so that gaps are formed between said surfaces. Because of this, a sealing effect of the connection system may be insufficient for the turbomachine. Moreover, the insufficient contact between said surfaces may have a negative effect on the stiffness with respect to the coupled vibration of the connection system.

There are known solutions which use circumferentially narrow stator devices, so that the de-arching is reduced. However, this has the disadvantage that more individual parts are needed, so that a method for connecting the individual parts is less efficient.

It is an object of the invention to provide such a stator device, a connection system for a turbomachine, and a turbomachine so that an improved sealing effect and an increased stiffness can be achieved in a hot state of the turbomachine.

One aspect of the invention provides a stator device for disposition in a given turbine casing of a turbomachine, the stator device being provided on its radially outer side with an axially forward connecting element having a radially inward facing forward connecting surface for connection to a forward receiving surface of the turbine casing and an axially rearward connecting element having a radially outward facing rearward connecting surface for connection to a rearward receiving surface of the turbine casing, the rearward connecting surface being pre-curved in the circumferential direction eccentrically with respect to the rearward receiving surface, the rearward connecting element having a rearward rib portion extending substantially linearly away from a platform of the stator device and providing the rearward connecting surface at its radially outer end, and the rib portion being provided at its radially outer end with axially extending projections distributed along the circumferential direction for radially retaining the stator device to the turbine casing.

The turbine casing is in particular given, and thus is not a component of the stator device according to the invention. The stator device is in particular suitable and adapted to be disposed within the turbine casing or fitted into the turbine casing. In particular, it is provided that the stator device is formed only over a section or segment in the circumferential direction, i.e., not over the entire circumference. Rather, it may be provided that a plurality of stator devices are arranged adjacent one another in the circumferential direction.

In particular, because the rearward connecting surface is eccentrically pre-curved in the cold state, it can advantageously de-arch when in a mounted state within the turbine casing in the hot state in such a manner that it is curved concentrically with the rearward receiving surface. Thus, it can be achieved that, in the mounted state, the rearward connecting surface contacts the rearward receiving surface over substantially its entire surface area in the circumferential direction. Therefore, a sealing effect between the rearward receiving surface and the associated connecting surface in areal contact therewith is significantly improved. In particular, the receptacles and the respective associated connecting elements may be form-fittingly connected at least at the contact surfaces, i.e., the connecting and receiving surfaces. This makes the connection between the turbine casing and the stator device stiff with respect to vibrations in the hot state, so that this connection can advantageously be extremely robust and low-maintenance in long-term operation.

In particular, in the mounted state, the stator device may be subjected to an axial force acting on the stator device due to the impinging flow of hot gas, so that the stator device, which is attached at its radially outer periphery, may behave in a manner similar to a cantilevered bending beam. As a result, a radially inwardly directed force may act on the axially forward connecting element. Advantageously, the forward connecting surface is thereby pressed onto the forward receiving surface, so that a force-fitting connection may exist in addition to the form-fitting connection. Similarly, a radially outwardly directed force may act on the axially rearward connecting element, so that the rearward connecting surface is advantageously pressed onto the rearward receiving surface, and a force-fitting connection may exist in addition to the form-fitting connection. This can further improve the stiffness of the connection system, so that the stiffness of the connection system with respect to vibrations in the hot state can advantageously be further improved, and the connection system can be extremely robust and low-maintenance in long-term operation.

Thus, it may be provided that, in a mounted state, at least the rearward receiving surface and the rearward connecting surface contact each other only partially in the cold state, but sealingly contact each other over a substantial surface area in the hot state for purposes of connecting the turbine casing to the stator device.

In particular, it may be provided that, in the mounted state, the eccentric, rearward connecting surfaces are substantially completely supported by the rib element, in particular outside the projections. Thus, load transfer from the stator device to the turbine casing can advantageously occur substantially or completely in the area of support. This reduces bending loads, thus advantageously reducing stresses. In particular, it may be provided for the rib portion to have a uniform supporting stiffness, as viewed in the circumferential direction, so that the loads can be transferred uniformly. In particular, it is provided that the projections, due to their dimensions and shape, are sufficiently soft, especially in comparison to a continuous rail, so as not to receive radial loads, in particular because they may be deformable and thus capable of yielding in a radial direction.

The stator device may in particular be inserted into the turbine casing and connected, in particular suspended or hooked in, and retained in its position by means of a retaining means of the connecting device. In particular, a plurality of stator devices may be arranged adjacent one another in the circumferential direction on the inside of the turbine casing, so that the turbine casing may be connected to stator devices around its entire circumference. For example, a stator device may cover a circular segment with a central angle of 30°, so that the turbine casing may be connected to, for example, 12 stator devices.

The "stator device" can in particular be understood to be a stationary component, especially if there is also a rotor. The stator device may, for example, be configured to direct the hot gas flow onto the rotors with a certain swirl. The stator device may, for example, be in the form of a stator vane, a stator vane segment or stator vane cluster, or an outer-air seal.

In particular, the annular shape of the turbine casing defines the centerline, which extends centrally within the annulus in the direction of flow. The centerline of the turbine casing may in particular correspond to a centerline of the turbomachine. "Axial" is to be understood in particular in reference to the centerline, and "axially forward" is to be understood to mean closer to an inlet for the hot gas flow of the turbine casing. Furthermore, the annular shape defines the radial direction, or a plurality of radial directions, extending from the centerline perpendicularly to the centerline, in particular orthogonally to the annular shape. "Radial" is to be understood in particular in reference to the radial direction, and "radially inwardly" is to be understood to mean closer to the centerline. "Radially inward facing" is to be understood to mean, in particular, in a direction toward the centerline, at least substantially but not necessarily parallel to the radial direction. Furthermore, the annular shape defines the circumferential direction, which extends perpendicularly to the centerline and perpendicularly to the radial direction. "Circumferentially" is to be understood in particular in reference to the circumferential direction.

The contact surfaces may in particular have a main direction of extension in the circumferential direction, which in particular extends in the circumferential direction with a width corresponding to the radially outer width of the stator device. Thus, a sealing effect may be provided over the entire width.

In particular, the forward receiving surface and/or the rearward receiving surface may be curved in the circumferential direction concentrically with respect to the centerline. This means that a center of curvature may in particular lie on the centerline. However, a corresponding radius of curvature of the forward receiving surface may differ from a corresponding radius of curvature of the rearward receiving surface. In particular, the receiving surfaces may be turned and/or ground together in one manufacturing step.

"Eccentric" is to be understood to mean, in particular, that respective curvatures in the circumferential direction do not have a common center of curvature or any respective center points whose connecting line is parallel to the centerline.

"Radially retaining the stator device to the turbine casing" can be understood to mean, in particular, that the stator device can be prevented from falling or slipping out of the turbine casing in a radial direction.

At least the rearward connecting surface is pre-curved in the circumferential direction. "Pre-curving" can be understood to mean that it has a predetermined curvature in the cold state. Preferably, the predetermined curvature can change from the cold state to the hot state. In particular, the rearward connecting surface is curved in the circumferential direction concentrically with the rearward receiving surface when in a hot state. The connecting surfaces can also be referred to as contact surfaces or support surfaces which, in particular, have a sealing function.

The rib portion extends substantially linearly, in particular radially, outwardly away from a platform of the stator device. "Substantially" is to be understood here to mean that the rib section does not necessarily have to extend parallel to the radial direction. Furthermore, the rib portion may extend, in particular mainly, in the circumferential direction. In particular, the rib portion extends linearly in the substantially radial direction of the rib portion. "Linearly" can be understood in particular that the rib portion may be substantially I-shaped. In particular, the rib portion is not L-shaped or hook-shaped. "Linearly" may, for example, be defined such that a radially inner end of the rib portion, which is connected to the platform, can be connected to a distal end of the rib portion by an imaginary straight line lying completely within the rib portion. In particular, the rib portion may have an axial thickness, an axial extent of the rearward connecting surface being less than or equal to the thickness of the rib portion.

The rib portion can in particular be referred to and/or configured as a load-bearing wall, specifically as a rearward load-bearing wall of the stator device. The connecting elements can be referred to in particular as holding elements.

The rib portion has the axially extending and circumferentially distributed projections at its radially outer end, in particular at an axially forward or axially rearward side surface of the end, i.e., of a radially outer end portion. In particular, the projections may be formed, as it were, locally or at some points in the circumferential direction. Accordingly, a projection per se is not formed along the circumferential direction, and thus does not correspond to a rail or the like. Rather, the projections are spaced apart from each other in the circumferential direction, so that the rib portion has no projection between the projections. For example, the rib portion may have a projection in each of its circumferentially outer regions, i.e., two projections. In particular, a plurality of projections may be uniformly distributed. In particular, it may be provided that an extent of a respective projection in the circumferential direction is smaller than an extent of the projection in the axial direction. For example, an extent of the projection in the circumferential direction may be about 80%, 60%, 50%, 40%, 30%, 20%, or 10% of the extent in the axial direction. With such local projections, the contact surface, which faces radially inwardly for radial retention and which, because of tolerances, must be ground, can advantageously be ground much more easily.

The projections have the advantage that they require less material than a rail extending in the circumferential direction or an L-shaped hook instead of the rib portion. Thus, the connection system can advantageously be made lighter in weight. This makes it possible, in particular, to increase a power density of the turbomachine, making it more efficient.

One embodiment provides that the forward connecting surface is pre-curved in the circumferential direction eccentrically with respect to the forward receiving surface. It is particularly because the rearward and forward connecting surfaces are eccentrically pre-curved in the cold state that, in a mounted state, they can advantageously de-arch in the hot state in such a way that they are curved concentrically with the associated receiving surfaces. In particular, the forward connecting surface is curved in the circumferential direction concentrically with the forward receiving surface when in a hot state. Thus, it can be achieved that the connecting surfaces contact the receiving surfaces over substantially their entire surface areas. Therefore, a sealing effect between the receiving surfaces and the connecting surfaces in areal contact therewith is significantly improved.

One embodiment provides that the rib portion has two or three projections. The rib portion may also have more than three, in particular four, five, or six projections. These may in particular be spaced apart from each other. Preferably, a first projection may be formed at or near a first circumferential end of the rib portion, and a second projection may be formed at or near a second circumferential end. An optional third projection may be formed in particular between the first projection and the second projection, preferably centrally therebetween. This enables the stator device to be retained to the turbine casing, in particular in the radial direction, while at the same time allowing for savings in material and weight as compared to a continuous holding rail in the circumferential direction. With such local projections, the contact surface, which faces radially inwardly for radial retention and which, because of tolerances, must be ground, can advantageously be ground much more easily, especially if the projections are near the circumferential ends and thus easily accessible. It is also advantageous that the contact surfaces of the projections can be ground linearly, i.e., no curved surface is required.

One embodiment provides that the projections extend axially forward and engage in hooks of the rearward receptacle for radial retention, the hooks being distributed along the circumferential direction. In other words, a hook shaped complementarily to a projection may be provided for each of the projections. In particular, the hooks may be formed, as it were, locally or at some points in the circumferential direction. Accordingly, a hook per se is not formed along the circumferential direction, and thus does not correspond to a rail or the like. Rather, the hooks are spaced apart from each other in the circumferential direction, so that the rearward receptacle has no hook between the hooks. For example, the rearward receptacle may have a hook in each of its circumferentially outer regions, i.e., two hooks. In particular, a plurality of hooks may be uniformly distributed. Thus, the stator device can advantageously be protected from falling out or slipping off the turbine casing in the radial direction in the mounted state. Alternatively and also advantageously, the projections may extend axially rearward and may be radially retained by separate retaining elements of the connection system. For example, the retaining element may embrace at least one projection and a spike of the rearward receptacle, allowing them to be held together.

One embodiment provides that the forward receiving surface is circularly convexly curved in the circumferential direction with a first radius of curvature. The associated center of curvature may in particular be located on the centerline.

Preferably, the forward connecting surface is circularly concavely pre-curved in the circumferential direction with a second radius of curvature smaller than the first radius of curvature. In particular, the forward connecting surface may thus be pre-curved more strongly compared to a curvature of the forward receiving surface. In particular, it may be provided that, in the cold state, only edge regions of the forward connecting surface, as viewed in the circumferential direction, contact the forward receiving surface in the mounted state, and a gap may then be formed between the edge regions and between said surfaces.

In the hot state, this gap can advantageously be closed by de-arching or de-curving of the forward receiving surface so that the contact surfaces contact each other over a substantial surface area in an air-sealing engagement. In particular, in the hot state, the second radius of curvature may correspond to the first radius of curvature. Preferably, the respective center of curvature may be located on the centerline.

One embodiment provides that the rearward receiving surface is circularly concavely curved in the circumferential direction with a third radius of curvature. The associated center of curvature may in particular be located on the centerline.

Preferably, the rearward connecting surface is circularly convexly pre-curved in the circumferential direction with a fourth radius of curvature smaller than the third radius of curvature. In particular, the rearward connecting surface may thus be pre-curved more strongly compared to a curvature of the rearward receiving surface. In particular, it may be provided that, in the cold state, only a central region of the connecting surface, as viewed in the circumferential direction, contacts the rearward receiving surface in the mounted state, and gaps may then be formed at edge regions adjacent the central region and between said surfaces.

In the hot state, these gaps can advantageously be closed by de-arching or de-curving of the rearward connecting surface in the mounted state so that the contact surfaces contact each other over a substantial surface area in an air-sealing engagement.

In particular, in the hot state, the fourth radius of curvature may correspond to the third radius of curvature. Preferably, the respective center of curvature may be located on the centerline.

One embodiment provides that the forward connecting surface and the rearward connecting surface are pre-curved concentrically with each other in the circumferential direction. In other words, the respective associated centers of curvature may lie on a connecting line parallel to the centerline, and the respective radii of curvature may differ. This has the advantage that these surfaces can be ground in one common step of a manufacturing process.

One embodiment provides that the rearward connecting surface is formed in a core region of the radially outer end of the linear rib portion, so that a force acting substantially radially outwardly on the rib portion is transferable within the rib portion to the rearward receptacle substantially free of bending stresses.

The "core region" can in particular be understood to be the region that is solidly bolstered by the linear rib portion in its substantially radial extent. Thus, the rearward connecting surface is not formed on a shoulder projecting from a stem of the rib portion.

The force acting on the stator device in the mounted state as a result of the hot gas flow can thus be transferred as a substantially radial normal force through the rib portion to the rearward receptacle of the turbine casing. Advantageously, therefore, the rib portion is loaded substantially only in compression in the substantially radial direction, but not with a moment. This can advantageously increase the durability of the rib portion. In particular, the thickness of the rib portion can advantageously be reduced as compared to a rib portion which, in addition, is subjected to moments. This enables material savings and makes it possible to increase the power density.

One embodiment provides that the forward receptacle has a substantially axially forwardly recessed groove that extends in the circumferential direction and provides the forward receiving surface at its radially inner sidewall surface. The groove can advantageously receive the forward connecting element without play in the fit. In particular, in an assembly step, the forward connecting element can be connected to the groove by pushing it axial forward.

One embodiment provides that the forward connecting element has a forward, substantially axially extending hook element having an axially forwardly extending end that engages in the groove and provides the forward connecting surface at its radially inner surface. Such a fit is advantageously particularly suitable since the forward connecting element cannot slide unintentionally out of the groove when in the mounted state.

One embodiment provides that a radially outer surface of the axially forwardly extending end of the hook element is pre-curved in the circumferential direction concentrically with a radially outer sidewall surface of the groove. It can thus advantageously be achieved that, in the mounted state, a play of the forward connecting element in the groove is reduced in the cold state and in the hot state, so that the stability of the connection system is increased. The radially outer sidewall surface is in particular opposite the radially inner sidewall surface. Preferably, an associated center of curvature may be located on the centerline. In particular, the radially outer surface may be pre-curved in the circumferential direction eccentrically or concentrically with respect to the forward connecting surface.

Preferably, it may be provided that the radially outer surface of the end of the hook element and the radially outer sidewall surface of the groove do not form contact surfaces with respect to each other. In particular, the aforesaid surfaces can ensure that a play in the fit is reduced and/or the insertion of the connecting element into the groove can be facilitated.

An alternative embodiment provides that the radially outer surface of the axially forwardly extending end of the hook element is pre-curved in the circumferential direction eccentrically with respect to the radially outer sidewall surface of the groove. In particular, the radially outer surface may be pre-curved with a smaller radius of curvature than the radially outer sidewall surface.

One embodiment provides that the radially outer surface and the radially inner surface, in particular the forward connecting surface, of the axially forwardly extending end of the hook element are pre-curved concentrically with each other in the circumferential direction. This makes it possible to grind these surfaces in one common step of a manufacturing process. In accordance with the concentricity of the radially outer surface and the forward connecting surface, the end of the hook element may have a constant thickness along the circumferential direction, as viewed in the radial direction.

One embodiment provides that the stator device is a stator vane segment formed by a plurality of stator vanes arranged adjacent one another in the circumferential direction. In particular, the stator vanes in the stator vane segment are fixedly interconnected. This has the advantage that fewer individual parts need to be connected to each other during assembly with the turbine casing. The connection system advantageously makes it possible to increase the number of stator vanes in the stator vane segment, since this connection system achieves a high sealing effect even with wide stator vane segments, as viewed in the circumferential direction. The stator vane segment may, for example, be formed by eleven stator vanes.

Another aspect of the invention provides a connection system for a turbomachine for connecting a turbine casing to the stator device. The connection system includes an annular turbine casing, which defines a centerline, a radial direction, and a circumferential direction. The turbine casing is provided on its radially inner side with an axially forward receptacle having a radially outward facing forward receiving surface and an axially rearward receptacle having a radially inward facing rearward receiving surface. The connection system further includes the at least one stator device according to the invention.

The stator device may in particular be inserted into the turbine casing and connected, in particular suspended or hooked in, and retained in its position by means of a suitable retaining means of the connecting device. In particular, the connection system may include a plurality of stator devices, which may be arranged adjacent one another in the circumferential direction on the inside of the turbine casing, so that the turbine casing may be connected to stator devices around its entire circumference. For example, a stator device may cover a circular segment with a central angle of 30°, so that the turbine casing may be connected to, for example, 12 stator devices.

The stator device may, for example, be in the form of a stator vane, a stator vane segment or stator vane cluster, or an outer-air seal.

Further embodiments of the connection system according to the invention follow directly from the various embodiments of the stator device according to the invention. In particular, individual features and corresponding explanations as well as advantages with regard to the various embodiments of the stator device according to the invention are analogously applicable to the corresponding embodiments of the connection system according to the invention.

A further aspect of the invention provides a turbomachine, in particular an aircraft gas turbine. The turbomachine includes at least one connection system according to the invention or at least one stator device according to the invention.

BRIEF DESCRIPTION OF THE DRAWINGS

Other features of the invention will be apparent from the claims, the figures, and the description of the figures. The features and feature combinations mentioned above in the description as well as the features and feature combinations mentioned below in the detailed description and/or shown in the figures may be encompassed by the invention not only in the respectively specified combination, but also in other combinations. In particular, the invention may also encompass embodiments and combinations of features which do not have all the features of an originally formulated claim. Moreover, the invention may encompass embodiments and combinations of features which go beyond or differ from the combinations of features set forth in the back-references of the claims. In the drawing.

DETAILED DESCRIPTION

Figure 1:
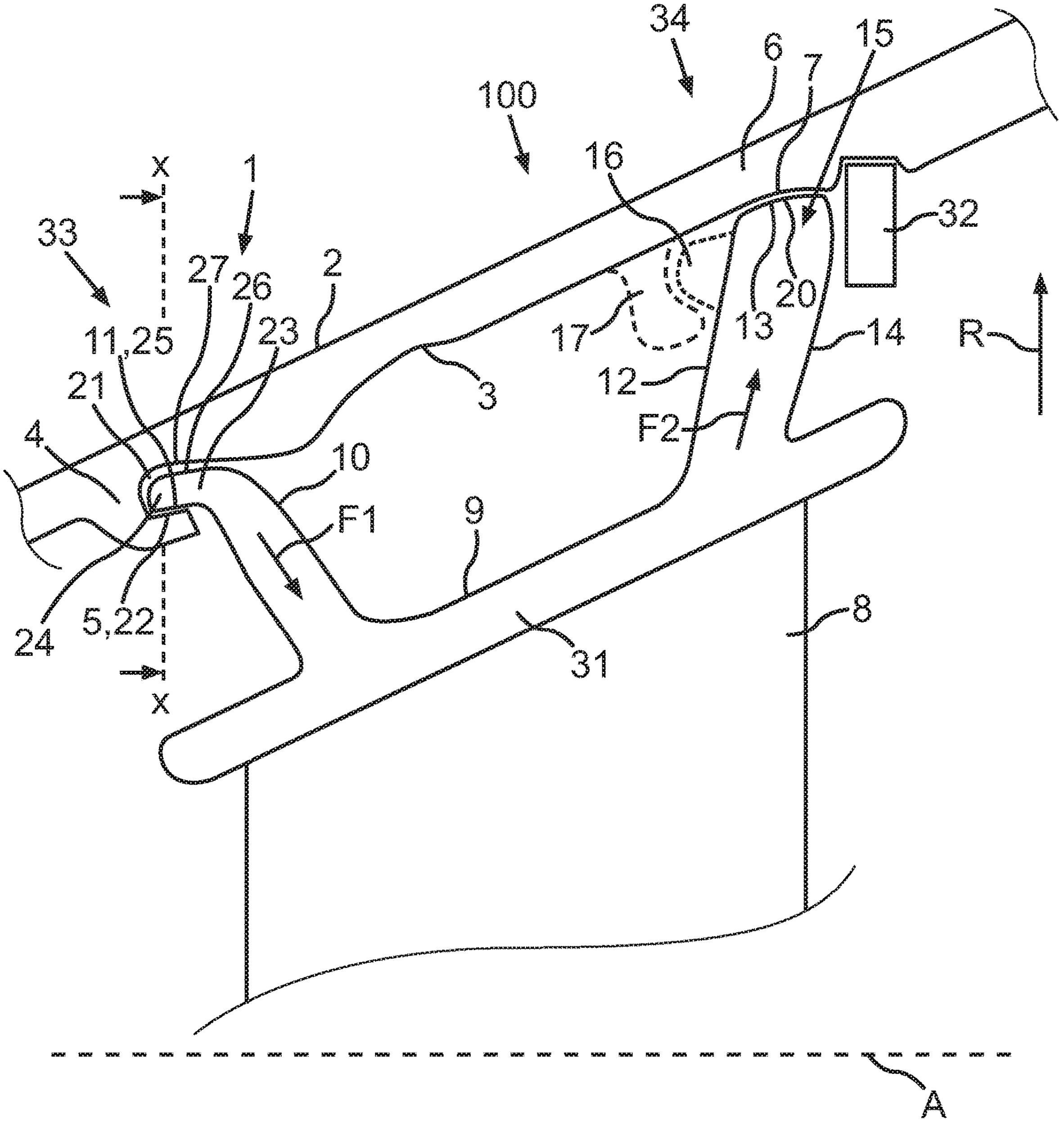
FIG. 1 is a schematic cross-sectional view of an exemplary embodiment of a connection system according to the invention.

FIG. 1 shows a schematic cross-sectional view of an exemplary embodiment of an inventive connection system 1 for a turbomachine 100. Connection system 1 may include an annular turbine casing 2 of a turbine of turbomachine 100 and a stator device 8, in particular a plurality of stator devices 8, which may be arranged adjacent one another in a circumferential direction U (see, e.g., FIG. 3). In an exemplary embodiment, stator device 8 may include a plurality of stator vanes, which may be arranged adjacent one another in circumferential direction U and fixedly interconnected by a platform 31 of the stator device. Turbine casing 2 and stator device 8 may be connected to each other via an axially forward connecting device 33 and via an axially rearward connecting device 34.

In particular, the annular shape of turbine casing 2 defines a centerline A extending centrally within the annulus in a direction of flow of turbomachine 100. Centerline A of turbine casing 2 may in particular correspond to a centerline of turbomachine 100. "Axial" is to be understood in particular in reference to centerline A, and "axially forward" is to be understood to mean closer to an inlet for the hot gas flow of turbine casing 2. Furthermore, the annular shape defines a radial direction R, or a plurality of radial directions R, extending from centerline A perpendicularly to centerline A, in particular orthogonally to the annular shape. "Radial" is to be understood in particular in reference to radial direction R, and "radially inward" is to be understood to mean closer to centerline A. "Radially inward facing" is to be understood to mean, in particular, in a direction toward centerline A, at least substantially but not necessarily parallel to radial direction R. Furthermore, the annular shape defines the circumferential direction U, which extends perpendicularly to centerline A and perpendicularly to radial direction R. "Circumferentially" is to be understood in particular in reference to circumferential direction U.

Forward connecting device 33 may include a forward receptacle 4 of turbine casing 2 and a forward connecting element 10 of stator device 8, which may be contactingly connected, in particular via a radially outward facing forward receiving surface 5 of forward receptacle 4 and a radially inward facing forward connecting surface 11 of forward connecting element 10.

Rearward connecting device 34 may include a rearward receptacle 6 of turbine casing 2 and a rearward connecting element 12 of stator device 8, which may be contactingly connected, in particular via a radially inward rearward receiving surface 7 of rearward receptacle 6 and a radially outward facing rearward connecting surface 13 of rearward connecting element 12.

In an exemplary embodiment, forward connecting surface 11 may be pre-curved in circumferential direction U eccentrically with respect to forward receiving surface 5. Furthermore, rearward connecting surface 13 may be pre-curved in circumferential direction U eccentrically with respect to rearward receiving surface 7.

In an exemplary embodiment, rearward connecting element 12 may have a rearward, substantially radially extending linear rib portion 14, which provides the rearward connecting surface 13 at its radially outer end 15. In particular, rib portion 14 may be provided at its radially outer 15 end with axially extending projections 16 distributed along circumferential direction U, which engage in hooks 17 of rearward receptacle 6, which are distributed along circumferential direction U. In accordance with the exemplary embodiment shown, projection 16 may be directed axially forward and hook 17 axially rearward. Projection 16 and hook 17 are represented in particular by dashed lines because of their limited extent in circumferential direction U. Projection 16 and hook 17 may preferably be formed, as it were, only locally or at some points in circumferential direction U. A stator device 8 may, for example, have two spaced-apart projections 16, and turbine casing 2 two associated hooks 17.

In an exemplary embodiment, stator device 8 may be prevented from axially or radially slipping out of receptacles 4, 6, especially in the cold state, by means of a retaining element 32, for example in the form of a split retaining ring.

In an exemplary embodiment, forward receptacle 4 may have an axially forwardly recessed groove 21 which extends in the circumferential direction and provides the forward receiving surface 5 at its radially inner sidewall surface 22. Forward connecting element 10 may have a forward, substantially axially extending hook element 23 having an axially forwardly extending end 24 that may engage in groove 21 and provide the forward connecting surface 11 at its radially inner surface 25.

Hook element 23 and groove 21 may in particular be continuous along the circumferential direction. Accordingly, the hook element may be configured in a rail-like manner.

It is provided that when turbomachine 100 is in an operating state, a hot gas flow from a combustor of turbomachine 100 enters the turbine and acts thermally and mechanically on stator device 8. In particular, the hot gas flow may cause rib portion 14 to be subjected to a radially outward force F2, so that rearward connecting surface 13 is pressed against rearward receiving surface 7. In an exemplary embodiment, rearward connecting surface 13 may be formed in a core region 20 of radially outer end 15 of linear rib portion 14, so that the force acting substantially radially outwardly on rib portion 14 is transferable within rib portion 14 to rearward receptacle 6 substantially free of bending stresses. Accordingly, force F2 may act as a normal force on rib portion 14.

In particular, the hot gas flow may cause forward connecting surface 11 to be subjected to a radially inward force F1, so that forward connecting surface 11 is pressed against forward receiving surface 5.

In particular, the hot gas flow may cause a radial temperature gradient to develop in the turbine. In this connection, a temperature difference may exist in particular between turbine casing 2 and the stator device. In particular, the hot gas flow may cause the connecting surfaces 11, 13, which are pre-curved in circumferential direction U, to de-arch or de-curve in circumferential direction U. In particular, connecting surfaces 11, 13 de-curve in a hot state such that they are curved concentrically with receiving surfaces 5, 7 in the hot state and form an air-sealing, stable, in particular form-fitting and force-fitting connection with the receiving surfaces.

Figure 2:
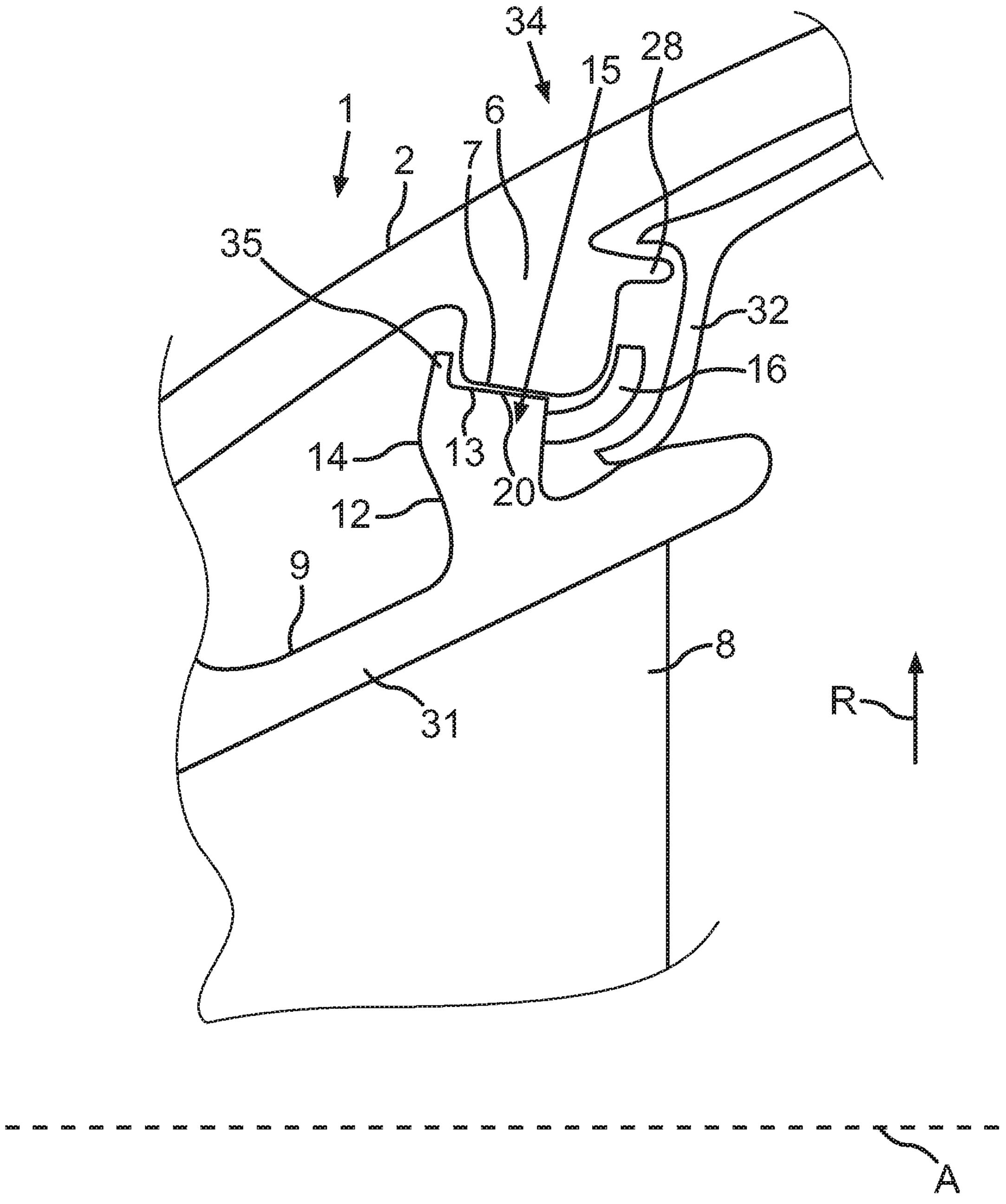
FIG. 2 is a schematic cross-sectional view of another exemplary embodiment of a rearward connecting device of a connection system according to the invention.

FIG. 2 shows a schematic cross-sectional view of another exemplary embodiment of the rearward connecting device 34 of a connection system 1 according to the invention. In comparison to the exemplary embodiment of FIG. 1, rearward receptacle 6 is radially inwardly larger in configuration, whereas rib portion 14 may be shorter in the radial direction. Rib portion 14 may in particular have a positioning element for positioning rib portion 14 on rearward receptacle 6. In this exemplary embodiment, the projection 16 on the axially rear side of rib portion 14, which projection is limited in circumferential direction U, may be hook-shaped axially toward the rear and radially toward the outside and may in particular embrace rearward receptacle 6 to a limited extent in circumferential direction U. Projection 16 is in particular formed only locally or at some points in circumferential direction U. In this exemplary embodiment, the retaining element 32 for retaining rearward connecting device 34 axially and radially in position may be clamp-shaped and may embrace projection 16 as well as a spike 28 formed axially at the rear of rearward receptacle 6. Connecting device 34 is in particular formed only locally or at some points in circumferential direction U.

Figure 3:
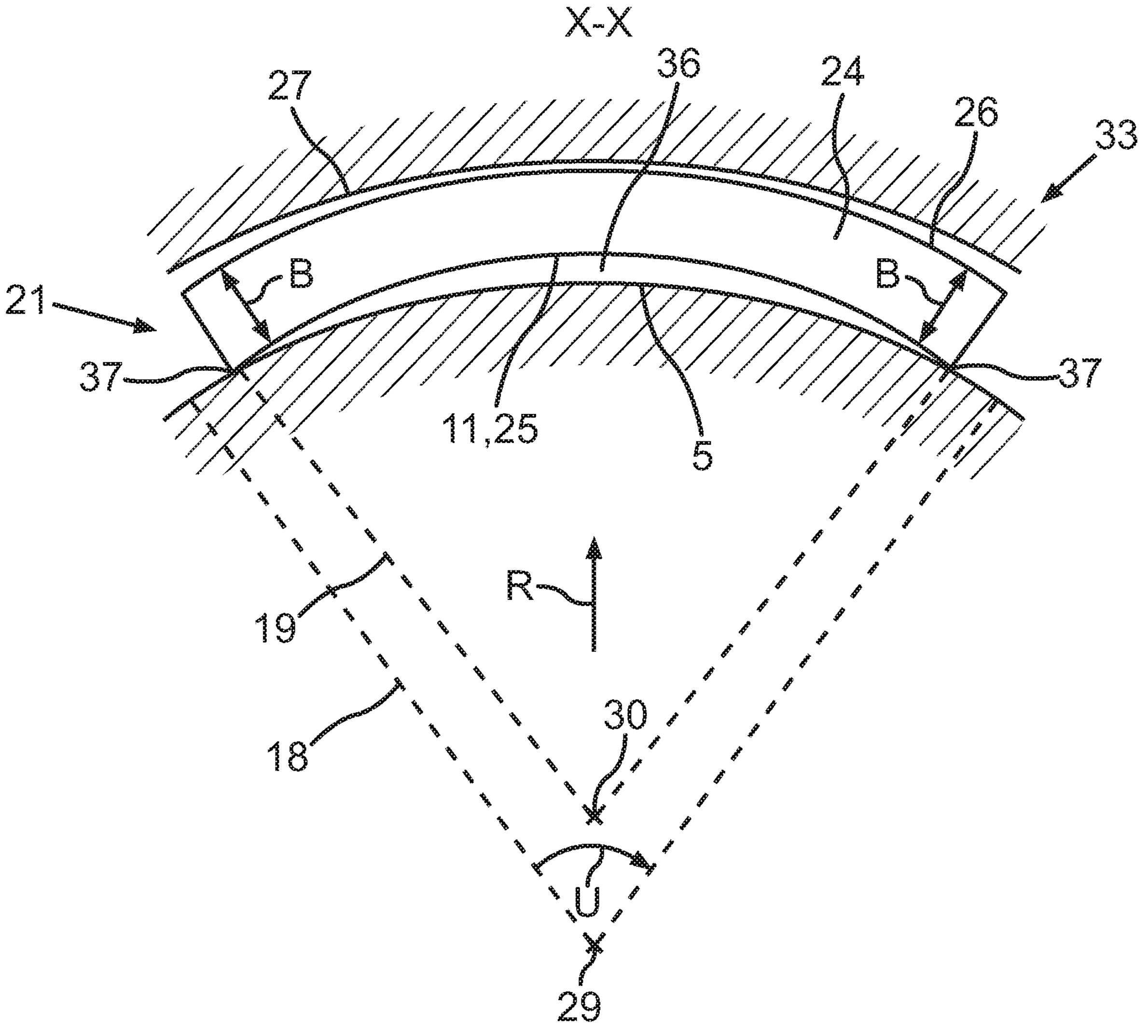
FIG. 3 is a schematic sectional view through the line X-X of a first exemplary embodiment of a forward connecting device of a connection system according to the invention.

FIG. 3 shows a schematic sectional view through the line X-X in FIG. 1 of a first exemplary embodiment of forward connecting device 33 of the inventive connection system 1 in the cold state.

In an exemplary embodiment, forward receiving surface 5 may be circularly convexly curved in circumferential direction U with a first radius of curvature 18. Preferably, an associated first center of curvature 29 may be located on centerline 29. Forward connecting surface 11 may be circularly concavely pre-curved in circumferential direction U with a second radius of curvature 19 smaller than first radius of curvature 18. In particular, an associated second center of curvature 30 may be located radially more outward than first center of curvature 29.

In this exemplary embodiment, a radially outer surface 26 of the axially forwardly extending end 24 of hook element 23 may be pre-curved in circumferential direction U eccentrically with respect to a radially outer sidewall surface 27 of groove 21. Preferably, radially outer sidewall surface 27 of groove 21 may be curved about first center of curvature 29 concentrically with forward receiving surface 5.

In an exemplary embodiment, radially outer surface 26 and radially inner surface 25, i.e., forward connecting surface 11, of the axially forwardly extending end 24 of hook element 23 may be pre-curved concentrically with each other in circumferential direction U. In particular, end 24 may have a radial width B that is constant in circumferential direction U.

It may be provided that, in the cold state, forward connecting surface 11 contacts the forward receiving surface only at the edge regions 37, thereby forming a gap 36. It may be provided that, in the hot state, this gap 36 is closed by de-curving of connecting surface 11, so that contact surfaces 5, 11 contact each other over a substantial surface area in an air-sealing engagement, in particular in a form-fitting and force-fitting manner.

Figure 4:
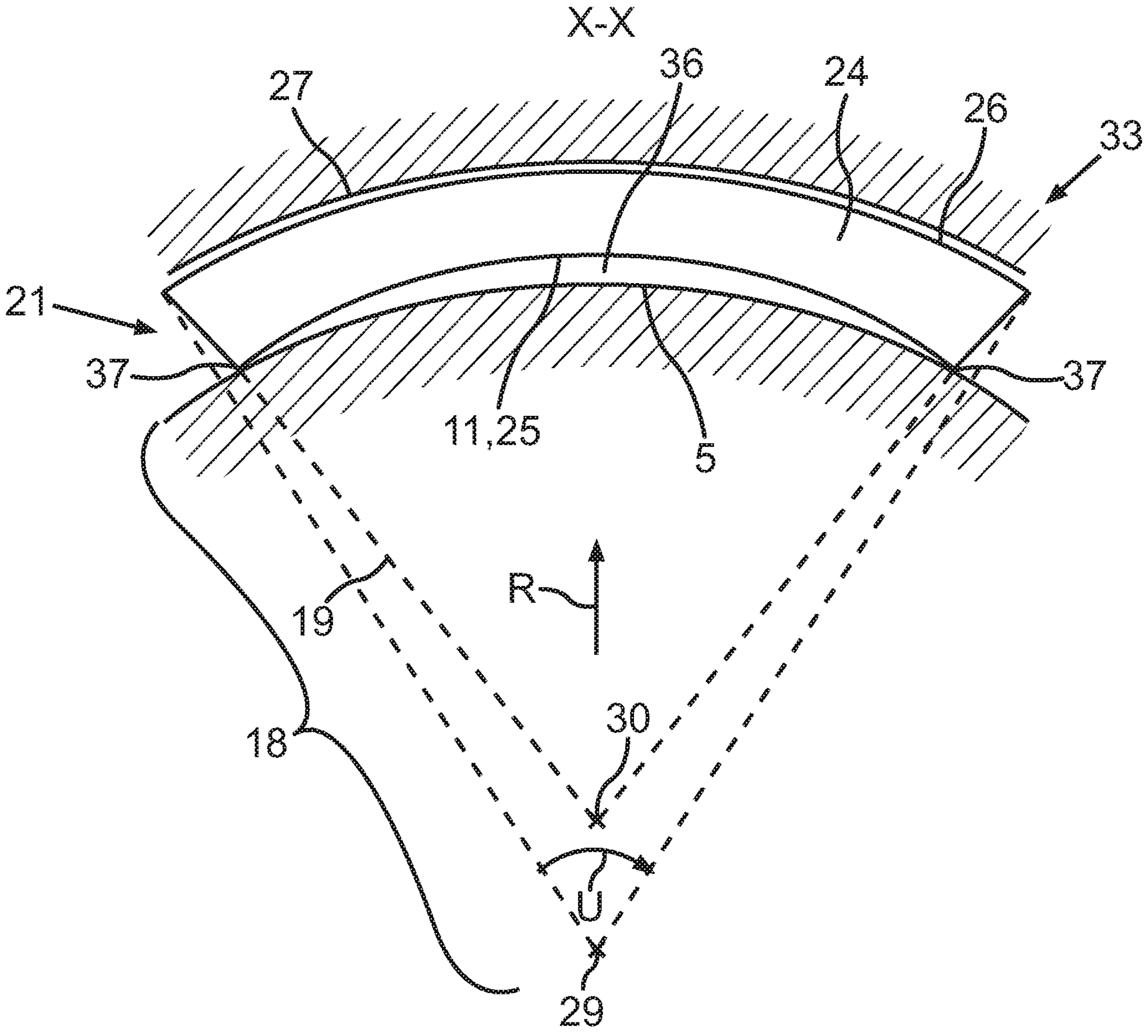
FIG. 4 is a schematic sectional view through the line X-X of a second exemplary embodiment of a forward connecting device of a connection system according to the invention.

FIG. 4 shows a schematic sectional view through the line X-X in FIG. 1 of a second exemplary embodiment of forward connecting device 33 of the inventive connection system 1 in the cold state.

In this exemplary embodiment, a radially outer surface 26 of the axially forwardly extending end 24 of hook element 23 may be pre-curved in circumferential direction U concentrically with radially outer sidewall surface 27 of groove 21, in particular about first center of curvature 29, about which forward receiving surface 5 may be curved as well, and which may be located on centerline A.

In this exemplary embodiment, too, forward receiving surface 11 may be circularly concavely pre-curved in circumferential direction U with second radius of curvature 19. In particular, an associated second center of curvature 30 may be located radially more outward than first center of curvature 29.

LIST OF REFERENCE CHARACTERS

1 connection system
2 turbine casing
3 radially inner side of the turbine casing
4 forward receptacle of the turbine casing
forward receiving surface of the forward receptacle
6 rearward receptacle of the turbine casing
7 rearward receiving surface of the rearward receptacle
8 stator device
9 radially outer side of the stator device
10 forward connecting element of the stator device
11 forward connecting surface of the forward connecting element
12 rearward connecting element of the stator device
13 rearward connecting surface of the rearward connecting element
14 rib portion of the rearward connecting element
15 outer end of the rib portion
16 projections
17 hook of the rearward receptacle
18 first radius of curvature
19 second radius of curvature
20 core region
21 groove
22 radially inner sidewall surface of the groove
23 hook element of the forward connecting element
24 end of the hook element
25 inner surface of the end of the hook element
26 outer surface of the end of the hook element
27 outer sidewall surface of the groove
28 spike
29 first center of curvature
30 second center of curvature
31 platform of the stator device
32 retaining element
33 forward connecting device
34 rearward connecting device
35 positioning element
36 gap
37 edge regions
A centerline
B width of the end
F1 first force
F2 second force
R radial direction
U circumferential direction
X section line

What is claimed is:

1. A stator device for disposition within a given turbine casing of a turbomachine, the stator device comprising:

on a radially outer side, an axially forward connecting element having a radially inward facing forward connecting surface for connection to a forward receiving surface of the turbine casing and an axially rearward connecting element having a radially outward facing rearward connecting surface for connection to a rearward receiving surface of the turbine casing, the rearward connecting surface being pre-curved in a circumferential direction eccentrically with respect to the rearward receiving surface;

the rearward receiving surface being curved concentrically in the circumferential direction about a centerline of the turbomachine;

the rearward connecting element having a rearward rib portion extending substantially linearly away from a platform of the stator device and providing the rearward connecting surface at a radially outer end; and the rib portion being provided at the radially outer end with axially extending projections distributed along the circumferential direction for radially retaining the stator device to the turbine casing.

2. The stator device as recited in claim 1 wherein the forward connecting surface is pre-curved in the circumferential direction eccentrically with respect to the forward receiving surface.

3. The stator device as recited in claim 1 wherein the rib portion has at least three of the projections.

4. The stator device as recited in claim 1 wherein the projections extend axially forward and are configured to engage in hooks of a rearward receptacle, the hooks being distributed along the circumferential direction, or the projections extend axially rearward and are configured to be radially retained by a retainer.

5. The stator device as recited in claim 1 wherein the forward receiving surface is circularly convexly curved in the circumferential direction with a first radius of curvature, and in that the forward connecting surface is circularly concavely pre-curved in the circumferential direction with a second radius of curvature smaller than the first radius of curvature.

6. The stator device as recited in claim 1 wherein the rearward connecting surface is circularly convexly pre-curved in the circumferential direction with a further radius of curvature smaller than the radius of curvature.

7. The stator device as recited in claim 1 wherein the forward connecting surface and the rearward connecting surface are pre-curved concentrically with each other in the circumferential direction.

8. The stator device as recited in claim 1 wherein the rearward connecting surface is formed in a core region of the radially outer end of the linear rib portion, so that a force acting substantially radially outwardly on the rib portion is transferable within the rib portion to the rearward receptacle substantially free of bending stresses.

9. The stator device as recited in claim 1 wherein a forward receptacle has an axially forwardly recessed groove extending in the circumferential direction and providing the forward receiving surface at a radially inner sidewall surface.

10. The stator device as recited in claim 9 wherein the forward connecting element has a forward, substantially axially extending hook element having an axially forwardly extending end engaging in the groove and provides the forward connecting surface at a radially inner surface.

11. The stator device as recited in claim 10 wherein a radially outer surface of the axially forwardly extending end of the hook element is pre-curved in the circumferential direction eccentrically with respect to a radially outer sidewall surface of the groove.

12. The stator device as recited in claim 11 wherein the radially outer surface and the radially inner surface of the axially forwardly extending end of the hook element are pre-curved concentrically with each other in the circumferential direction.

13. The stator device as recited in claim 1 wherein the stator device is a stator vane segment formed by a plurality of stator vanes arranged adjacent one another in the circumferential direction.

14. A connection system for a turbomachine comprising:

an annular turbine casing defining a centerline, a radial direction, and a circumferential direction, and having on an radially inner side an axially forward receptacle having a radially outward facing forward receiving surface and an axially rearward receptacle having a radially inward facing rearward receiving surface; and the stator device as recited in claim 1.

15. A turbomachine comprising at least one stator device as recited in claim 1.

16. An aircraft gas turbine comprising the turbomachine as recited in claim 15.

* * * * *